US005295756A

United States Patent [19]

Ohta

[11] Patent Number: 5,295,756

[45] Date of Patent: Mar. 22, 1994

[54] SCREW TIGHTENING TYPE CONNECTOR

[75] Inventor: Yukio Ohta, Shizuoka, Japan

[73] Assignee: Yazaki Corporation, Japan

[21] Appl. No.: 949,068

[22] Filed: Sep. 22, 1992

[30] Foreign Application Priority Data

Oct. 1, 1991 [JP] Japan .............................. 3-79680[U]

[51] Int. Cl.[5] .............................................. F16D 1/02

[52] U.S. Cl. .................................. 403/407.1; 403/16; 403/19; 403/24; 439/359; 411/402; 74/89.13; 74/89.15; 74/424.7

[58] Field of Search .................... 403/407.1, 7, 19, 20, 403/22, 24, 25, 16, 405.1; 411/402, 407, 919; 439/359; 74/424.7, 424.5, 89.13, 89.14

[56] References Cited

U.S. PATENT DOCUMENTS

| | | | |
|---|---|---|---|
| 2,938,690 | 5/1960 | Castle | 74/89.14 X |
| 4,217,788 | 8/1980 | Burr et al. | 74/425 |
| 4,478,103 | 10/1984 | Benjamin | 74/424.5 X |
| 4,627,759 | 12/1986 | Kato et al. | 403/343 X |
| 4,629,351 | 12/1986 | Kato et al. | 403/405.1 X |
| 4,685,848 | 8/1987 | Langer | 411/407 X |
| 4,869,614 | 9/1989 | Fisher | 403/20 X |
| 4,957,449 | 9/1990 | Hatagishi | 403/22 X |
| 5,169,334 | 12/1992 | Makita | 439/359 X |

FOREIGN PATENT DOCUMENTS 63-13283 1/1988 Japan .

*Primary Examiner*—Randolph A. Reese
*Assistant Examiner*—Harry C. Kim
*Attorney, Agent, or Firm*—Wigman, Cohen, Leitner & Myers

[57] ABSTRACT

A screw tightening type connector having a female connector and a male connector fitted in the female connector. The female connector is provided with a female screw body, while a male screw body is provided on the male connector. The male connector is screwed into the female screw body and is tightened whereby the female connector and the male connector are fitted in each other. A rotational-force imparting section is provided for imparting a rotational force to the male screw body. The rotational-force imparting section has a rotary shaft extending in a direction intersected with a fitting direction of the male connector into the female connector. A rotational-force transmitting section is provided for converting the rotational force from the rotational-force imparting section to a rotational force in a direction intersected with the rotary shaft to transmit the rotational force to the male screw body.

9 Claims, 6 Drawing Sheets

SCREW TIGHTENING TYPE CONNECTOR

BACKGROUND OF THE INVENTION

The present invention relates to a screw tightening type connector in which a bolt provided on a connector housing of a male connector is screwed into a nut provided on a fitting hood section of a female connector and is tightened, whereby the male connector is fitted in and retained in the female connector.

FIG. 1 of the attached drawings shows a conventional screw tightening type connector I which has been proposed in Japanese Patent Laid-Open No. 63-13283. As shown in FIG. 1, the screw tightening type connector 1 comprises a male connector 3 and a female connector 9 having a fitting hood section 7 in which a connector housing 5 of the male connector 3 is fitted.

A plurality of terminal accommodating chambers (not shown) are formed in the connector housing 5 of the male connector 3. Female terminal elements (not shown) are accommodated respectively in the terminal accommodating chambers. Moreover, a through bore 17 is formed at a substantially central portion of the connector housing 5 of the male connector 3, along a fitting direction of the connector housing 5 into the fitting hood section 7. A bolt 11 is inserted into the through bore 17 such that a male screw portion 17*a* is located or positioned adjacent to the fitting hood section 7, at a location within the through bore 17. The bolt 11 is inserted also such that a bolt head 15 serving as a rotational-force imparting section is located adjacent to a location where a plurality of wires are drawn out of the connector housing 5. Further, a wire protecting cover 12 is fixedly mounted by fixing means (not shown) at a location adjacent to a side where the wires 19 of the connector housing 5 are drawn. Thus, a plurality of wires 19 drawn from a location within the terminal accommodating chambers (not shown) in the connector housing 5 are bent substantially perpendicularly.

A plurality of terminal accommodating chambers (not shown) are formed in a housing section 23 which is formed integrally with the fitting hood section 7 of the female connector 9. A plurality of male terminal elements (not shown) are accommodated respectively in the terminal accommodating chambers. The male terminal elements have respective forward end portions thereof which project into the fitting hood section 7. Under a condition that the connector housing 5 of the male connector 3 is fitted in the fitting hood section 7, the forward end portions of the male terminal elements are fitted respectively in the female terminal elements and are electrically connected thereto. Moreover, a support section 25 is provided in projection on a substantially central portion within the fitting hood section 7 of the female connector 9. A nut 13 serving as a female screw body is embedded in the support section 25. An opening 25*a* in communication with the female threaded portion of the nut 13 is formed in the forward end portion of the support section 25.

Fitting of the male connector 3 into the female connector 9 is executed as follows. That is, as shown in FIG. 2A, the connector housing 5 is inserted into the fitting hood section 7. The forward end portion of the bolt 11 serving as a male screw body is inserted into the opening 25*a* in the support section 25. The bolt head 15 of the bolt 11 and an engaging portion 29 at the forward end of, for example, an impact wrench 27 serving as a jig for imparting the rotational force are engaged with each other. Rotation of the impact wrench 27 imparts the rotational force to the bolt 11 so that the bolt 11 is screwed into the nut 13.

The bolt 11 is further rotated and tightened whereby the connector housing 5 is inserted into a deep portion within the fitting hood section 7 and is fitted therein. Under a condition that the connector housing 5 is perfectly fitted in the fitting hood section 7, the connector housing 5 is perfectly fitted into the fitting hood section 7 and is retained by a tightening or fastening condition between the bolt 11 and the nut 13 as illustrated in FIG. 2B. Thus, the female terminal element and the male terminal element are electrically connected to each other.

However, the screw tightening type connector 1 having no protecting cover has the following problem. That is, since the bolt head 15 of the bolt 11 is located or positioned along the fitting direction (a direction a indicated by the arrow) of the connector housing 5 into the fitting hood section 7, the wires 19 drawn out of the terminal accommodating chambers stand in the way. Thus, tightening operability of the bolt 11 due to the impact wrench 27 is inferior or is deteriorated.

Furthermore, there is the following problem. That is, since the bolt head 15 is positioned adjacent to the location where the wires are drawn out of the connector housing 5, a protective cover 21 for protecting the wires from the impact wrench 27 is required. Thus, a cost of the connector 1 rises.

SUMMARY OF THE INVENTION

It is therefore an object of the invention to provide a screw tightening type connector in which fitting operability of a connector housing of a male connector into a fitting hood section of a female connector is improved, and a protecting cover is not required.

According to the invention, there is provided a screw tightening type connector comprising:

a first connector:

a second connector fitted in the first connector;

a first screw body provided on the first connector;

a second screw body provided in the second connector, the second screw body being screwed into the first screw body and being tightened so that the first connector and the second connector are fitted in each other;

a rotational-force imparting section for imparting a rotational force to the second screw body, the rotational-force imparting section having a rotary shaft extending in a direction crossing to a fitting direction of the second connector into the first connector; and a rotational-force transmitting section for converting the rotational force from the rotational-force imparting section to a rotational force in a direction crossing to the rotary shaft to transmit the rotational force to said second screw body.

According to the invention, the rotational-force imparting section is formed in the direction crossing to the fitting direction of the connector housing into the fitting hood section. Accordingly, a plurality of wires drawn out of a wire drawing side of the connector housing are not damaged by, for example, a jig or the like for imparting the rotational force to the rotational-force imparting section. Further, a protecting cover for protecting the wires is not required. Furthermore, in a case where a working or operating space is narrowed in the fitting direction of the connector housing into the fitting hood section, since the rotational-force imparting section is provided in the direction crossing to the fitting direction, the wires do not disturb the screwing operation. Thus, workability or operability improves, and there is also no case where the wires are damaged.

DETAILED DESCRIPTION OF THE PREFERRED EMBODIMENTS

Various embodiments of a screw tightening type connector according to the invention will next be described.

First Embodiment

Figure 1:
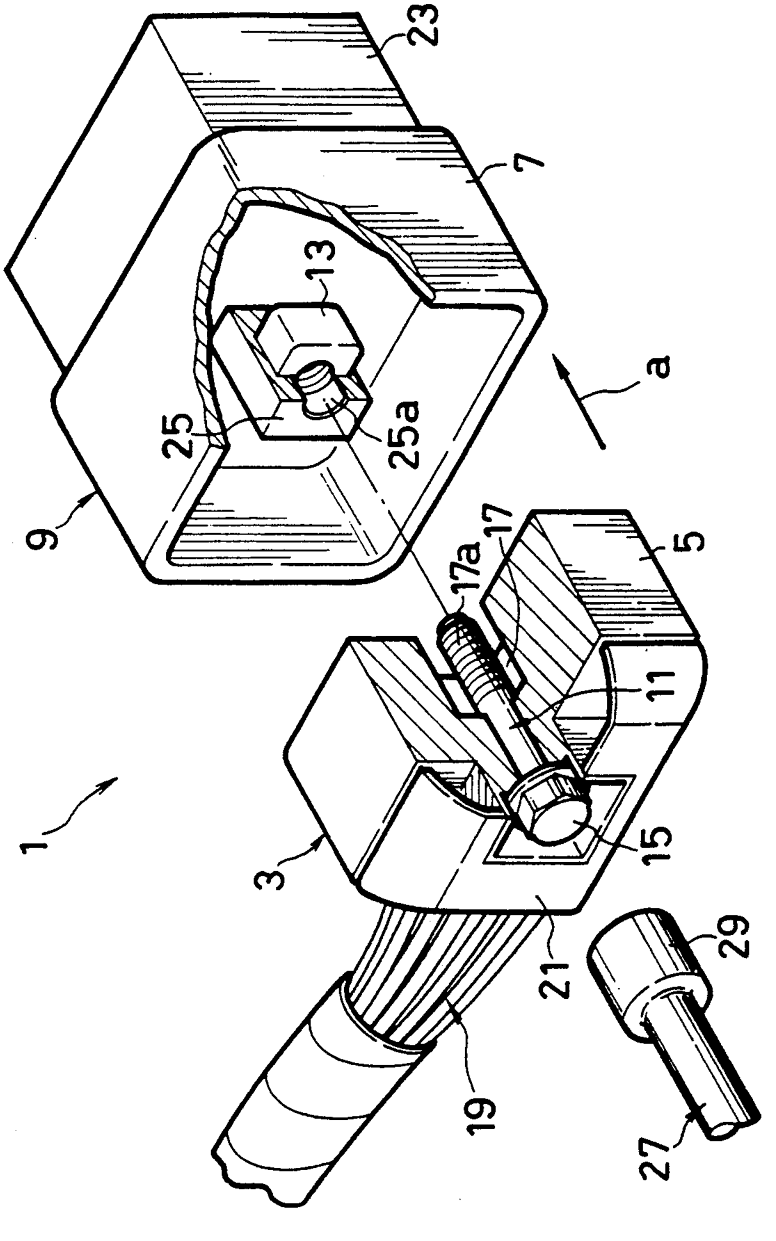
FIG. 1 PRIOR ART
FIG. 1 is a perspective view showing a conventional screw tightening type connector.
Figure 2A:
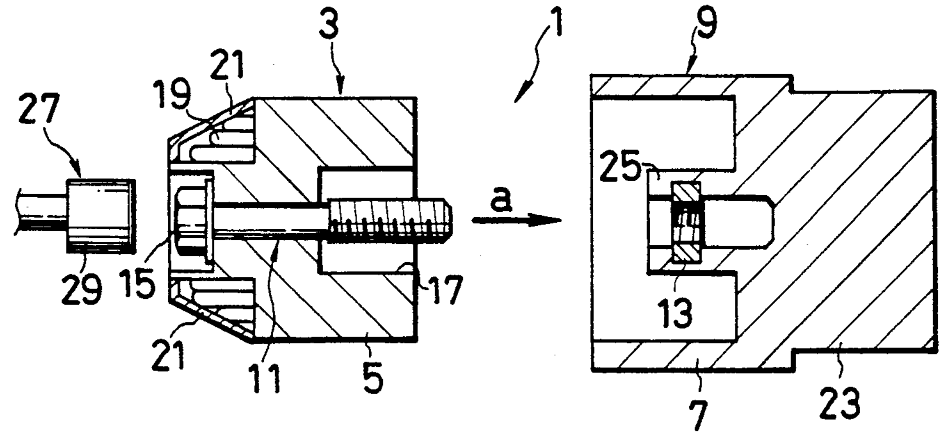
FIG. 2A PRIOR ART
FIGS. 2A and 2B are cross-sectional views showing the conventional screw tightening type connector.
Figure 2B:
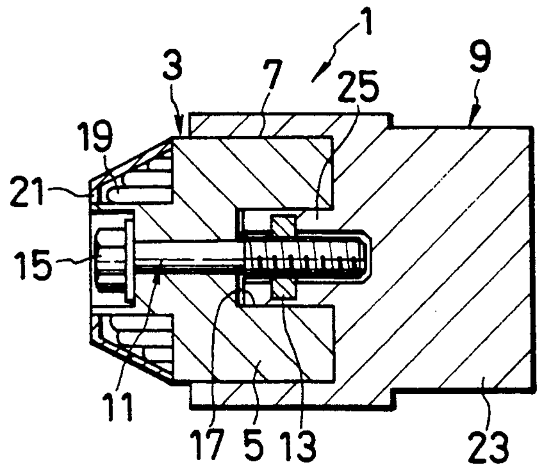
FIG. 2B PRIOR ART
Figure 3:
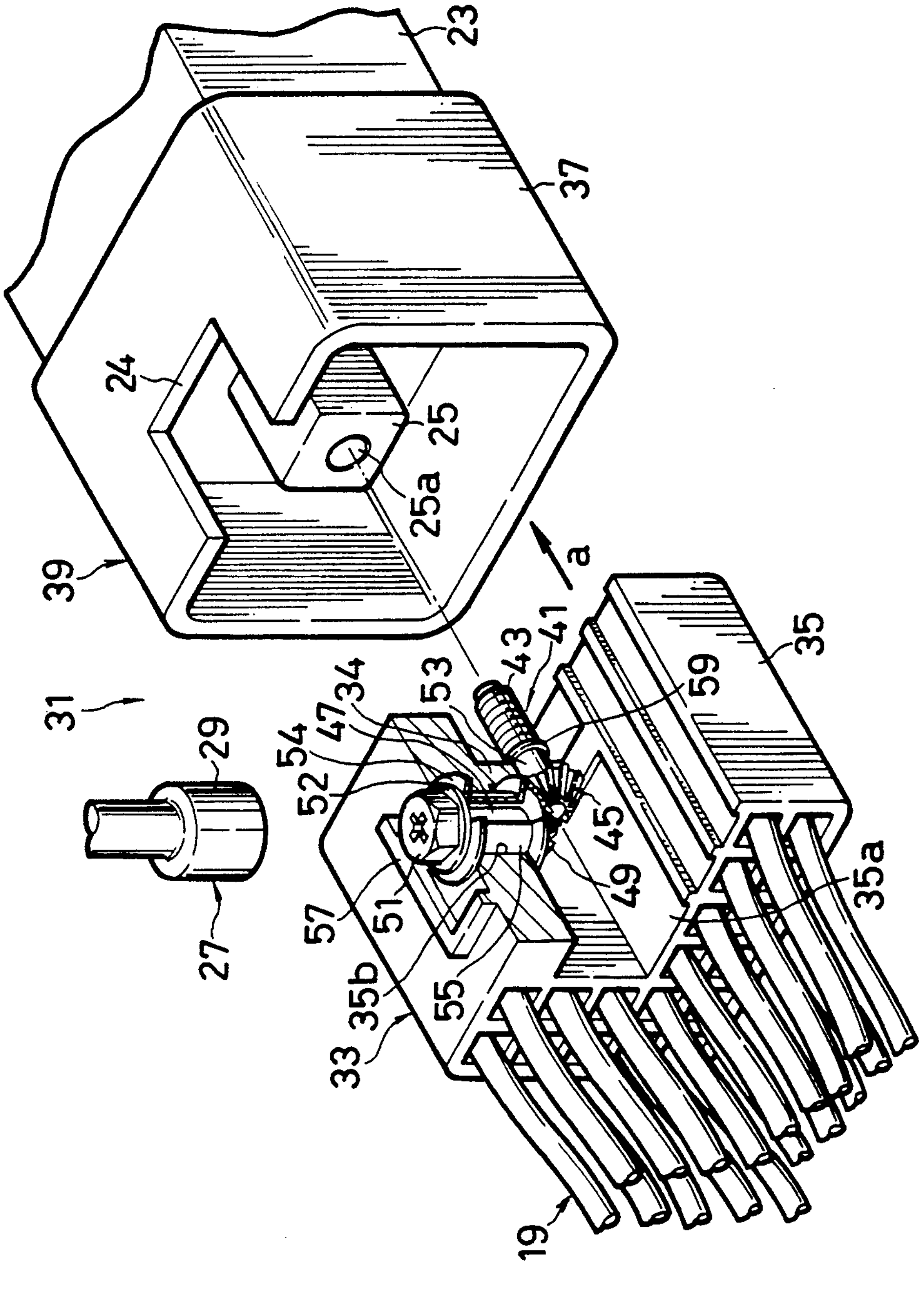
FIG. 3 is a perspective view showing a screw tightening type connector according to a first embodiment of the invention.
Figure 4A:
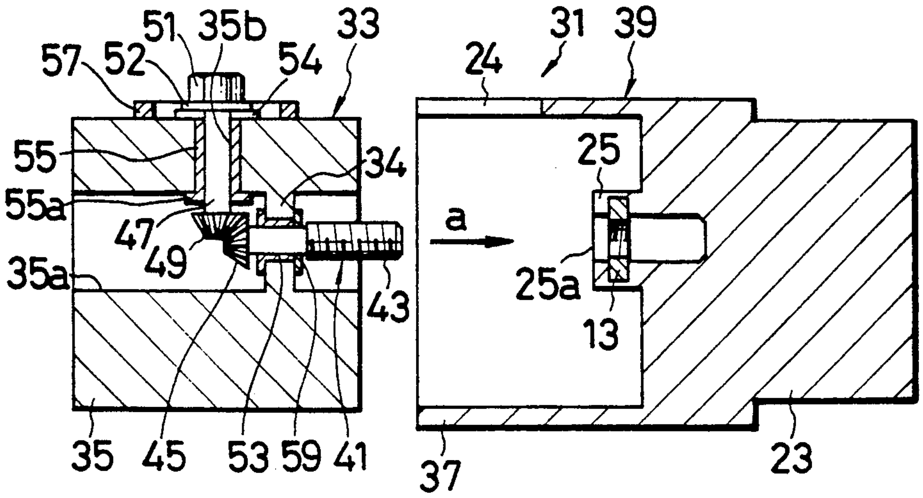
FIGS. 4A and 4B are cross-sectional views showing the screw tightening type connector according to the first embodiment of the invention.
Figure 4B:
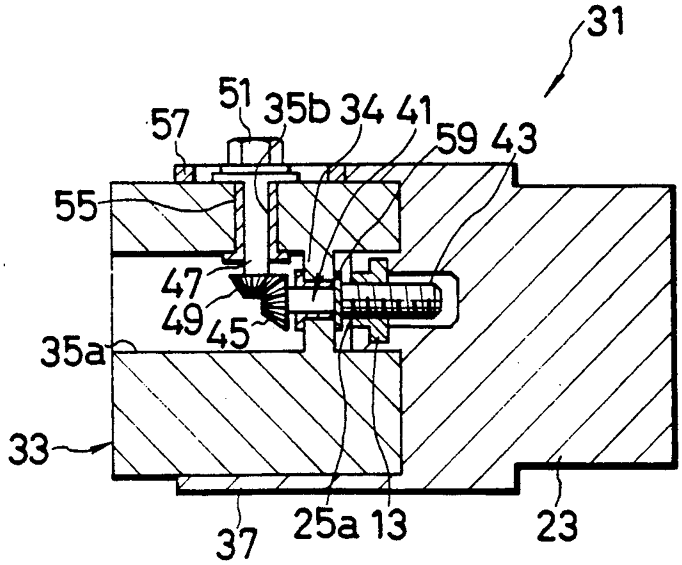

Referring first to FIG. 3 and FIGS. 4A and 4B, there is shown a screw tightening type connector 31 according to a first embodiment of the invention. In FIG. 3 and FIGS. 4A and 4B, the screw tightening type connector 31 comprises a male connector 33, and a female connector 39 provided with a fitting hood section 37 in which a connector housing 35 of the male connector 33 is fitted.

A housing section 23 provided integrally with the fitting hood section 37 of the female connector 39 is formed with a plurality of terminal accommodating chambers (not shown). A plurality of male terminal elements (not shown) are accommodated respectively in the terminal accommodating chambers. The male terminal elements have respective forward end portions thereof which project into the fitting hood section 37. Under a condition that the connector housing 35 of the male connector 33 is fitted in the fitting hood section 37, the male connector 33 is fitted in a female terminal element so as to be electrically connected thereto. Further, a support section 25 is provided in projection on a substantially halfway or central portion of the female connector 39 within the fitting hood section 37. A nut 13 serving as a female screw element is embedded in the support section 25. The support section 25 has a forward end portion thereof which is formed therein with an opening 25a which is in communication with a female screw portion of t nut 13. The fitting hood section 37 is provided with a rectangular cut-out 24.

The connector housing 35 of the male connector 33 is provided with a plurality of terminal accommodating chambers (not shown). A plurality of female terminal elements (not shown) are accommodated respectively in the terminal accommodating chambers.

A space or void 35a is formed in a substantially central portion of the connector housing 35 of the male connector 33. A support portion 34 is provided at an intermediate portion within the void 35a. A bolt 41 serving as a male screw element has a neck which is inserted into the support portion 34 through a collar 53. The bolt 41 is prevented from coming off by a bush nut 59. The bolt 41 comprises a male screw portion 43, and a bevel gear 45 which is fixedly mounted adjacent to a wire-drawing-out side (a rearward side in a fitting direction a). A rotational axis direction of each of the nut 13 and the bolt 41 is in coincident with a fitting direction a of the male connector 33 to the female connector 39. The bolt 41 is formed so as to be able to be screwed into the nut 13.

Furthermore, a through bore 35b is formed which extends along a direction crossing to the bolt 41, that is, along a direction intersected with a fitting direction (a direction a indicated by an arrow) of the connector housing 35 with respect to the fitting hood section 37. A rotary shaft 47 is inserted into the through bore 35b through a collar 55. A bevel gear 49 in meshing with the bevel gear 45 is provided on a lower end portion of the rotary shaft 47. A head 51 serving as a rotating-force imparting section is formed at an upper end portion of the rotary shaft 47, and is exposed to an outer periphery of the connector housing 35. The head 51 is formed into a hexagonal configuration fitted in an impact wrench 27. A rectangular protecting wall 57 projects from an outer periphery of the connector housing 35, at a location in the periphery of the head 51. The protecting wall 57 is fitted in the rectangular cut-out 24 in the fitting hood section 37 of the female connector 39.

The bevel gears 45 and 49 cooperate with each other to define a rotational-force transmitting section. The bevel gears 45 and 47 may include straight bevel gears and spiral bevel gears.

Procedure in which the bolt 41 and the rotary shaft 47 are assembled with the connector housing 35 of the male connector 33 will be described.

First, assembling of the bolt 41 is executed as follows. That is, the collar 53 is inserted into the void 35a in the connector housing 35, and is inserted through the support portion 34. Then, the bolt 41 is inserted along the collar 53. Next, the push nut 59 is fitted on the bolt 41 from a location adjacent to the male screw portion 43. By doing so, it is prevented that the bolt 41 fall out of the void 35a.

Next, assembling of the rotary shaft 47 is executed as follows. That is, the collar 55 is expanded and the rotary shaft 47 is inserted thereinto. The collar 55 is inserted into the through bore 35b formed in the connector housing 35 such that the collar 55 is narrowed, that is, a diameter thereof is reduced. Thus, the bevel gear 49 engages with the bevel bear 45. When the collar 55 is inserted through the through bore 35b, a collar or a flange 55a is expanded so that the flange 55a serves as a stopper. Under this condition, the rotary shaft 47 is supported on the connector housing 35 rotatably by the collar 55. A collar or a flange 52 is formed at an end of the rotary shaft 47 opposite to the bevel gear 49. A washer 34 is interposed between the flange 32 and the connector housing 35.

Fitting of the connector housing 35 of the male connector 33 arranged as described above, into the fitting hood section 37 of the female connector 39 will be described. That is, the connector housing 35 is positioned or aligned with the fitting hood section 37. Thereafter, the connector housing 35 is moved toward the fitting hood section 37. The forward end portion of the bolt 41 is inserted into the opening 25a in the support section 25. The male screw portion 43 of the bolt 41 is screwed into the nut 13 which serves as the female screw body. A forward end portion of the impact wrench 27 is engaged with the head 51. When the impact wrench 27 is rotated in this condition, the rotary shaft 47 is rotated. A rotating force is transmitted to the bolt 41 through the bevel gears 49 and 45 so that the bolt 41 is rotated. Thus, the male threaded portion 43 is threadedly engaged with the nut 13 and is tightened. By doing so, the connector housing 35 is fitted in the fitting hood section 37. Under a condition that the connector housing 35 is perfectly fitted in the fitting hood section 37, the head 51 of the rotary shaft 47 is positioned within the cut-out 24. Thus, the connector housing 35 is fitted in and is retained in the fitting hood section 37.

In this manner, according to the invention, the head 51 is provided in the direction crossing to the fitting direction of the connector housing 35 into the fitting hood section 37. Accordingly, a plurality of wires 19 drawn out of the connector housing 35 do not disturb the screwing operation. Thus, fitting operability of the connector housing of the male connector into the fitting hood section of the female connector is improved, and a protecting cover is not required.

Second Embodiment

A screw tightening type connector 61 according to a second embodiment of the invention will next be described with reference to FIG. 5 and FIGS. 6A and 6B. The present embodiment is an example in which a bolt is provided at a fitting hood section of a female connector so that a nut is embedded in a male connector.

Figure 5:
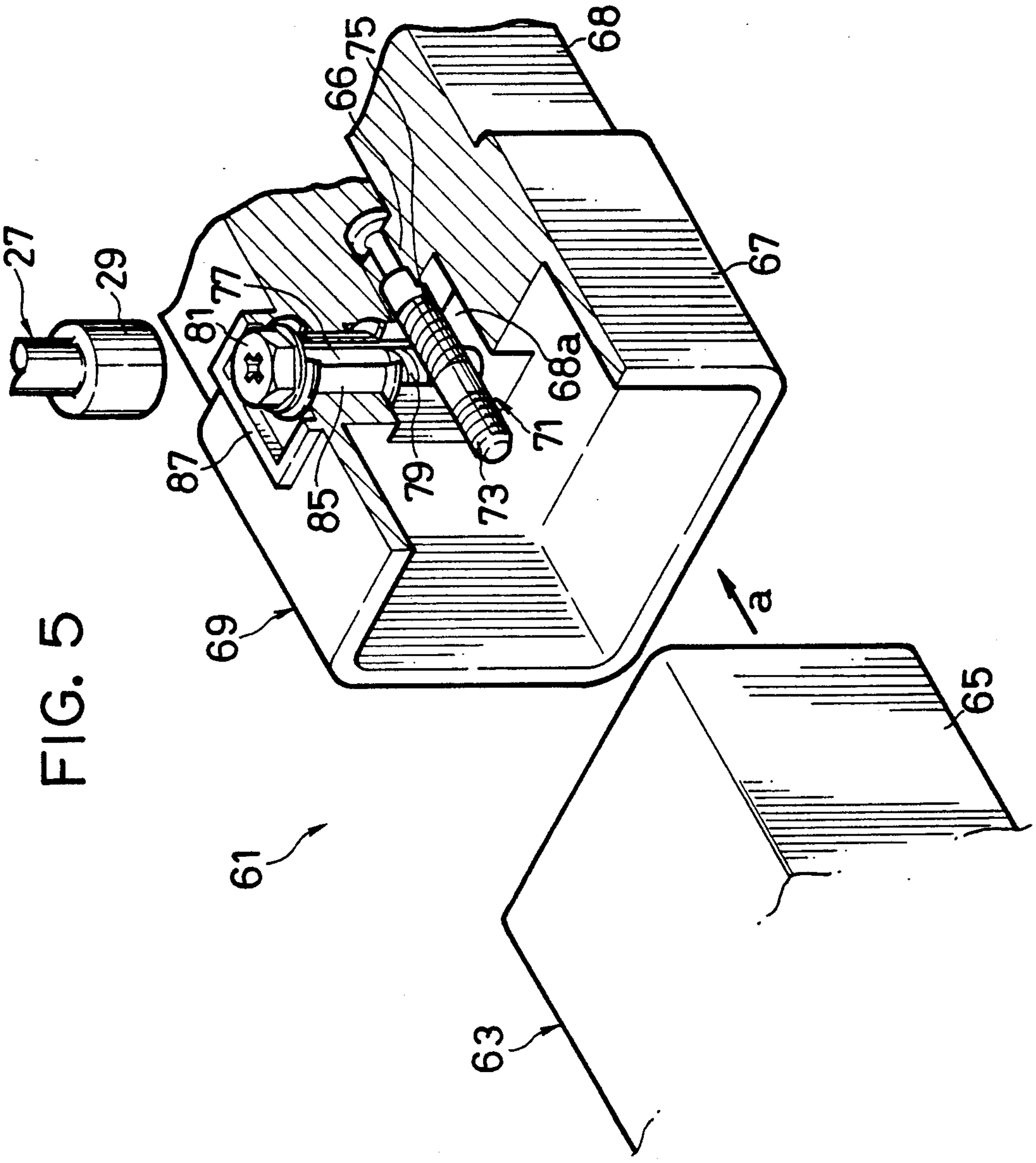
FIG. 5 is a perspective view showing a screw tightening type connector according to a second embodiment of the invention.

As shown in FIG. 5, the screw tightening type connector 61 according to the present embodiment comprises a male connector 63, and a female connector 69 formed with a fitting hood section 67 into which a connector housing 65 of the male connector 63 is fitted.

Figure 6A:
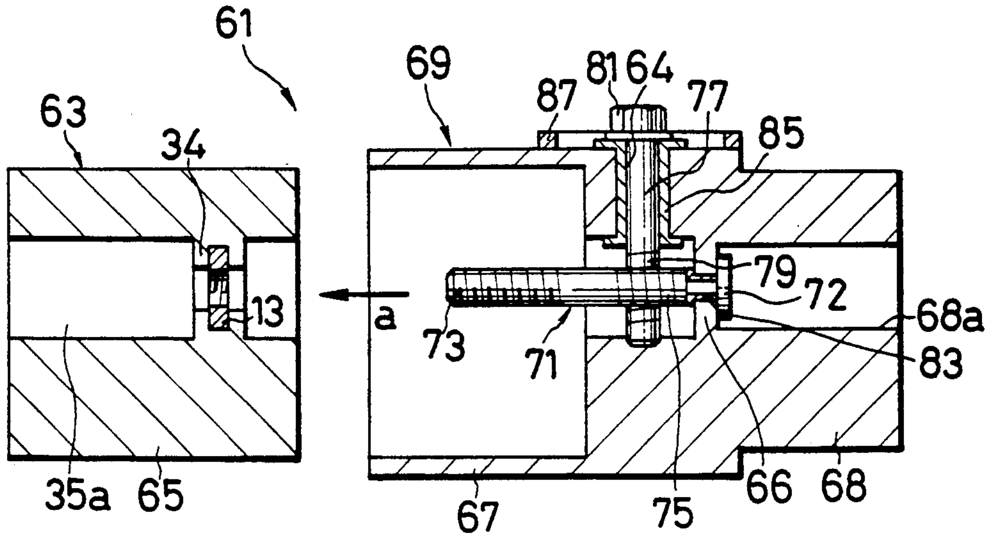
FIGS. 6A and 6B are cross-sectional views showing the screw tightening type connector according to the second embodiment of the invention.
Figure 6B:
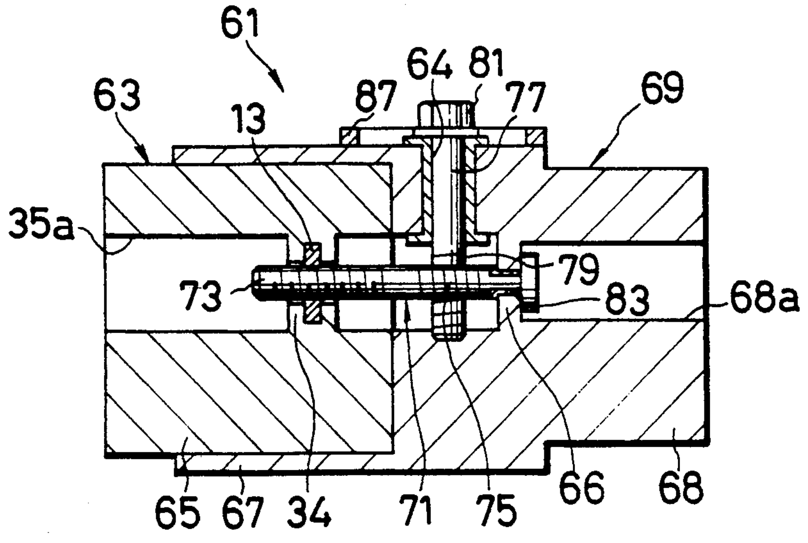

As shown in FIGS. 6A and 6B, a void 35*a* is defined at a substantially intermediate or central portion of a connector housing 35 of the male connector 63. A support portion 34 is provided in an intermediate portion of the void 35*a*. A nut 13 serving as a female screw body is embedded in the support portion 34.

Further, a void 68*a* is defined substantially at a central portion of a housing 68 of the female connector 69. A support portion 66 is provided in an intermediate portion of the void 68*a*. A neck of a bolt 71 is inserted into the support portion 66 through a collar 83. The bolt 71 has a forward end portion thereof at which a male screw portion 73 is formed, and an intermediate portion at which a screw 75 is formed. A head 72 in the form of a plate is provided at an end of the bolt 71 opposite to the male screw portion 73.

A through bore 64 is formed along a direction crossing to the bolt 71, i.e., along a direction intersected with a fitting direction (a direction a indicated by an arrow) of the connector housing 65 into the fitting hood section 67. A rotary shaft 77 is rotatably inserted in the through bore 64 through a collar 85. The rotary shaft 77 has a lower end thereof at which a screw 79 in mesh with the screw 75 is formed. A head 81 serving as a rotating-force imparting section is formed at an upper end portion of the rotary shaft 77 and is exposed to an outer periphery of the connector housing 65. A protecting wall 87 projects in the circumference of the head 81 from the outer periphery of the connector housing 65. The screws 75 and 79 cooperate with each other to form a screw gear. Further, the screws 75 and 79 cooperate with each other to form a rotating-force transmitting section.

Fitting of the connector housing 65 of the male connector 63 into the fitting hood section 67 of the female connector 69 arranged as described above is executed as follows. That is, the connector housing 65 is inserted into the fitting hood section 67. The bolt 71 is inserted into the support portion 34. The male threaded portion 73 is screwed into the nut 13. An impact wrench 27 is engaged with the head 81, and is rotated. Then, a rotating force thereof is transmitted to the bolt 71 through the screws 79 and 75. The bolt 71 is rotated and is tightened to the nut 13. By doing so, the connector housing 65 is inserted into and is fitted in the fitting hood section 67.

In this manner, according to the present embodiment, the rotary shaft 77 is provided in the direction crossing to the fitting direction of the connector housing 65 into the fitting hood section 67. Accordingly, a plurality of wires 19 drawn out of the connector housing 65 do not disturb the screwing operation. Fitting operability of the connector housing 65 of the male connector 63 into the fitting hood section 67 of the female connector 69 is improved, and the protecting cover is not required.

What is claimed is:

1. A screw tightening type connector for connecting a plurality of wires, comprising:
   - a first connector;
   - a second connector fitted in said first connector;
   - a first screw body provided on said first connector;
   - a second screw body provided in said second connector, said second screw body being screwed into said first screw body and being tightened so that said first connector and said second connector are fitted in each other;
   - a rotational force imparting section for imparting a rotational force to said second screw body, said rotational force imparting section comprising a rotary shaft having a tool engaging means extending beyond an outer periphery of said second connector, said rotary shaft extending in a direction transverse to the plurality of wires passing through the second connector; and
   - rotational force transmitting section for converting the rotational force from said rotary shaft to said second screw body.

2. A screw tightening type connector according to claim 1, wherein said rotational-force transmitting section includes a first bevel gear provided on said second screw body and a second bevel gear provided on said rotary shaft and in mesh with said first bevel gear.

3. A screw tightening type connector according to claim 1, wherein said rotational force transmitting section includes a first thread provided on said second screw body, and a second thread provided on said rotational force imparting section and in mesh with said first thread, said first and second threads cooperating with each other to form a screw gear.

4. A screw tightening type connector for connecting a plurality of wires, comprising:
   - a female connector;
   - a male connector fitted in said female connector;
   - a female screw body provided in said female connector;
   - a male screw body provided on said male connector, said male screw body being screwed into said female screw body and being tightened whereby said female connector and said male connector are fitted in each other;

a rotational force imparting section for imparting a rotational force to said male screw body, said rotational-force imparting section comprising a rotary shaft having a tool engaging means extending beyond an outer periphery of said male connector, said rotary shaft extending in a direction transverse to the plurality of wires passing through the male connector; and a rotational force transmitting section for converting the rotational force from said rotary shaft to said male screw body.

5. A screw tightening type connector according to claim 4, wherein said rotational force transmitting section includes a first bevel gear provided on said male screw body and a second bevel gear provided on said rotary shaft and in mesh with said first bevel gear.

6. A screw tightening type connector for connecting a plurality of wires, comprising:

a male connector;

a female connector fitted on said male connector;

a female screw body provided on said male connector;

a male screw body provided on said female connector, said male screw body being screwed into said female screw body and being tightened whereby said male connector and said female connector are fitted in each other;

a rotational force imparting section for imparting a rotational force to said male screw body, said rotational force imparting section comprising a rotary shaft having a tool engaging means extending beyond an outer periphery of said female connector, said rotary shaft extending in a direction transverse to the plurality of wires passing through the female connector; and a rotational-force transmitting section for converting the rotation force from said rotary shaft to said male screw body.

7. A screw tightening type connector according to claim 6, wherein said rotational force transmitting section includes a first thread provided on said male screw body, and a second thread provided on said rotational force imparting section and in mesh with said first thread, said first and second threads cooperating with each other to form a screw gear.

8. A screw tightening type connector according to claim 1, wherein said rotary shaft has a head exposed to the outer periphery of said second connector.

9. A screw tightening type connector according to claim 4, wherein an outer periphery of the female connector housing includes a fitting hood section provided with a rectangular cut-out through which a rotary shaft head is rotatably manipulated.

* * * * *